United States Patent [19]

Smith

[11] Patent Number: 4,573,699
[45] Date of Patent: Mar. 4, 1986

[54] TRAILER BACK-UP COUPLING

[75] Inventor: Ronald F. Smith, Monroe, Wash.

[73] Assignee: Safety Equipment Corporation, Monroe, Wash.

[21] Appl. No.: 635,167

[22] Filed: Jul. 27, 1984

[51] Int. Cl.⁴ .............................................. B62D 53/08
[52] U.S. Cl. .................................. 280/432; 280/446 B; 280/474; 280/DIG. 14
[58] Field of Search .................... 280/432, 445, 446 B, 280/457, 474, DIG. 14

[56] References Cited

U.S. PATENT DOCUMENTS

| | | | |
|---|---|---|---|
| 1,734,969 | 11/1929 | Hatashita | 280/474 |
| 3,420,548 | 1/1969 | Wakeman | 280/446 B |
| 3,497,241 | 2/1970 | Jones | 280/432 |
| 3,963,265 | 6/1976 | Kornoelje et al. | 280/432 |
| 4,119,330 | 10/1978 | Capps | 280/432 |
| 4,120,514 | 10/1978 | Sanders | 280/432 |
| 4,252,336 | 2/1981 | Hubbard | 280/474 |

Primary Examiner—John A. Pekar
Assistant Examiner—Charles R. Watts
Attorney, Agent, or Firm—B. P. Fishburne, Jr.

[57] ABSTRACT

To enable a semi-trailer or full trailer to back up on a straight path, a remotely controlled locking plunger attached to the fifth wheel of a tractor or converter dolly is extended upwardly to enter a bushing carried by the king pin plate on the bottom of the trailer. The arrangement locks the trailer against pivoting relative to the tractor fifth wheel around the axis of the king pin.

5 Claims, 4 Drawing Figures

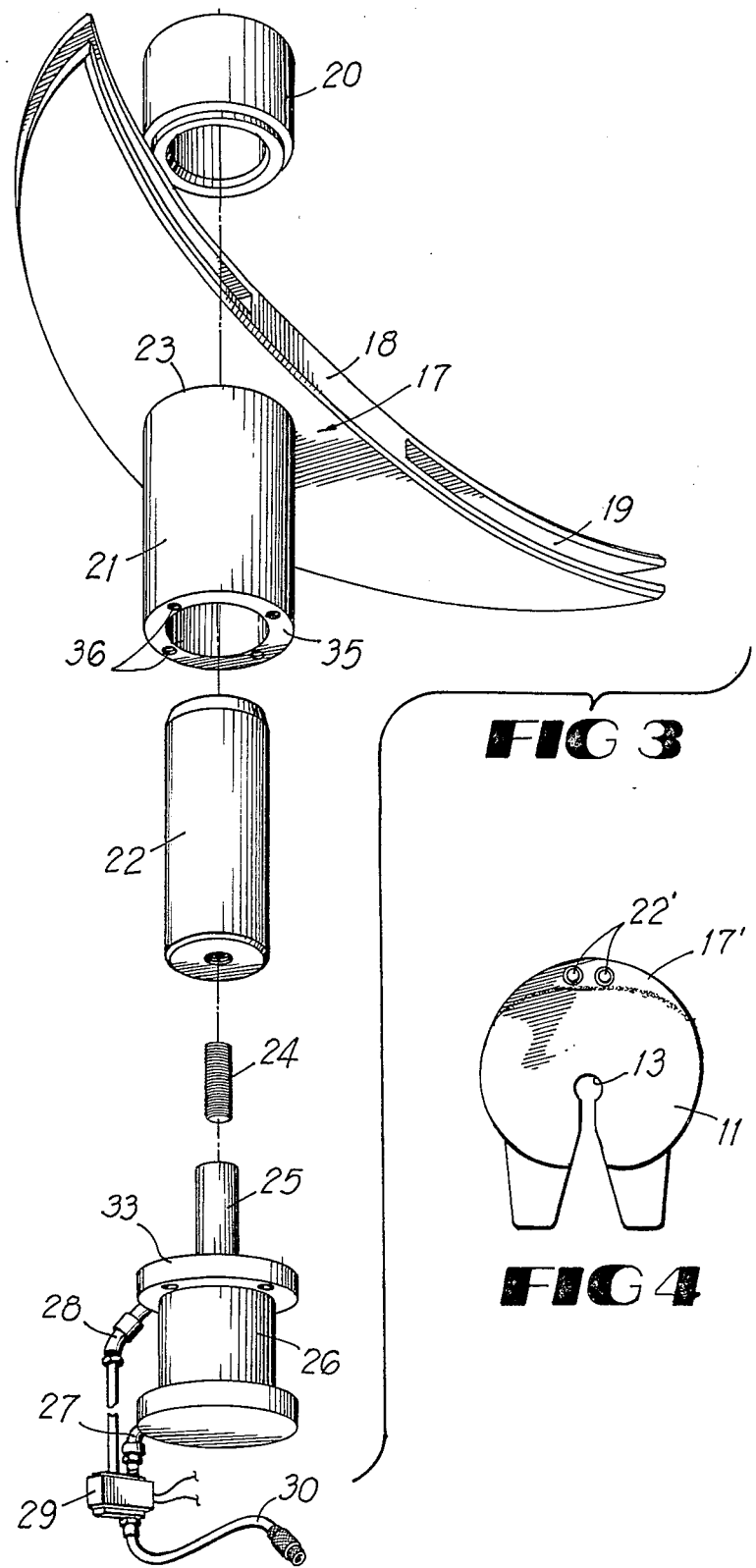

TRAILER BACK-UP COUPLING

BACKGROUND OF THE INVENTION

The objective of the present invention is to provide a practical and economical means to permit straight line backing up of semi-trailer or full trailer vehicle combinations, which operation cannot be accomplished by drivers possessing normal driving skills. The economic advantage offered by the invention is the substantial saving of time at each delivery or pick-up location where straight backing up of the vehicle is desirable or necessary. Also, if a driver mistakenly drives his rig into a narrow dead-end street, this invention will allow the driver to safely back out of his mistake. Another advantage of the invention is that the device embodying the invention can be activated where a tractor-trailer rig is left unattended so that it can only be driven away on a straight path. This will prevent theft of the rig.

Prior U.S. Pat. No. 4,120,514 shows a safety device for tractor-trailers to prevent jackknifing by limiting the articulation angle around the axis of the king pin. The device does not enable backing up of the rig in a straight line. Furthermore, in the prior patent, the safety coupler device is installed directly on the tractor fifth wheel and requires expensive installation procedures which the present invention completely avoids.

SUMMARY OF THE INVENTION

In accordance with the present invention, a trailer or semi-trailer straight line back-up coupling device is mounted bodily on a bracket plate which may be attached economically to the fifth wheel of any existing tractor or to any newly manufactured fifth wheel unit. The coupling assembly, except for a bushing which is installed on the king pin plate of the trailer, is prefabricated as a fully operational unit which can be installed with relative ease on a fifth wheel. This eliminates the otherwise costly and slow procedure which would normally be required to install the straight line back-up coupling device directly on a fifth wheel without any previous attachment or fabrication of the device to a fifth wheel attachable bracket.

The invention can be embodied in a single locking plunger unit or a dual plunger unit for extremely heavy duty applications.

Other features and advantages of the invention will become apparent to those skilled in the art during the course of the following description.

BRIEF DESCRIPTION OF THE DRAWINGS

FIG. 3 is an exploded perspective view of the invention components.

FIG. 4 is a plan view showing a dual coupling or locking plunger embodiment of the invention on a fifth wheel.

DETAILED DESCRIPTION

Figure 1:
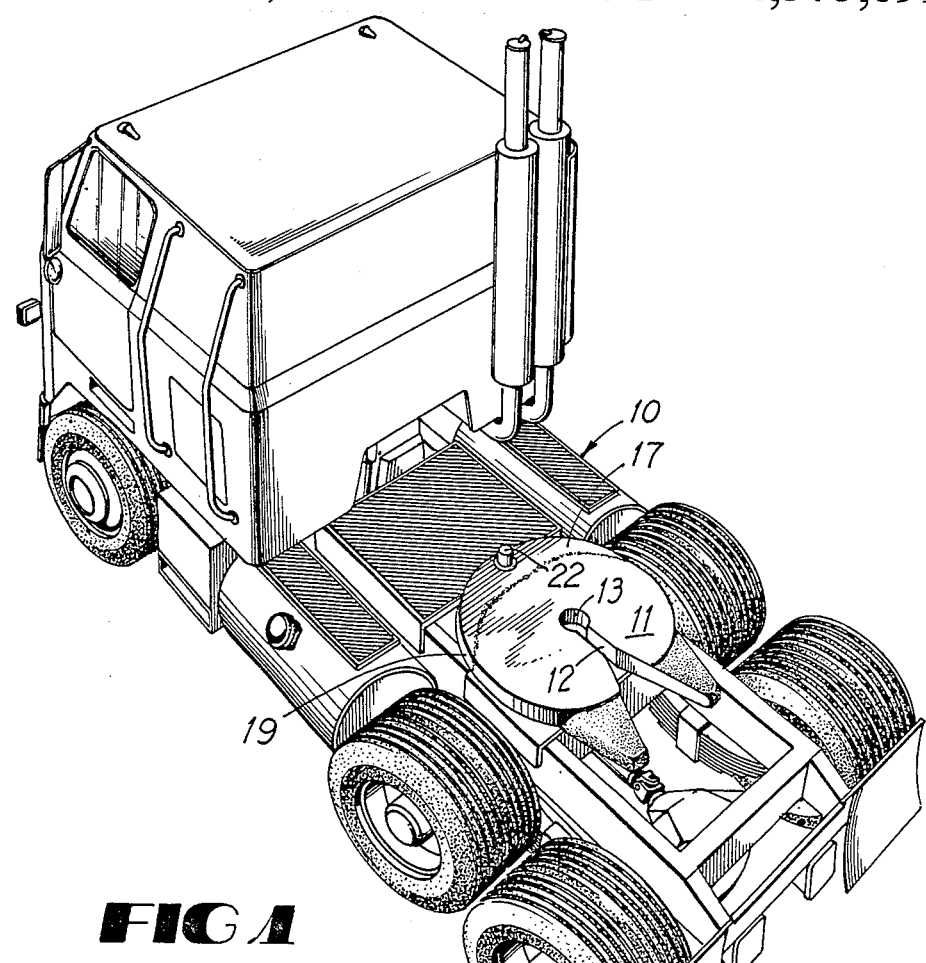
FIG. 1 is a perspective view of a tractor having a fifth wheel equipped with the straight line back-up coupling attachment or unit according to the invention.

Referring to the drawings in detail, wherein like numerals designate like parts, a tractor unit 10 of the type used in semi-trailer or full trailer rigs includes the customary fifth wheel plate 11 having a rearwardly opening slot 12 leading into a central opening 13 which receives a king pin 14, depending from the king pin plate 15 of a trailer 16. When the trailer king pin 14 enters the fifth wheel opening 13, the trailer can pivot relative to the tractor 10 around the vertical axis of the king pin to allow normal turning and maneuvering of the rig. As previously explained, the purpose of the present invention is to allow straight line backing up of any semi-trailer or full trailer rig equipped with the invention without requiring unusual driver skills and with a great savings of time.

The invention proper which is depicted in FIG. 3 comprises a crescent-like bracket or mounting plate 17 having a solid central portion 18 and horizontally slotted end portions 19. This bracket or mounting plate for the invention can be applied solidly and economically to any existing or new fifth wheel by welding, as shown in the drawings, or by other techniques as by bolting through the slotted end portions 19, if preferred. In effect, the mounting plate 17 becomes an integral forward extension on the conventional fifth wheel 11 and requires little or no modification of the fifth wheel to accept the invention.

The other components of the invention except for a steel coupling bushing 20 are preassembled or prefabricated to the mounting plate 17 in accordance with a very important aspect of the invention which reduces the labor and time required to install it on the fifth wheel 11.

Figure 2:
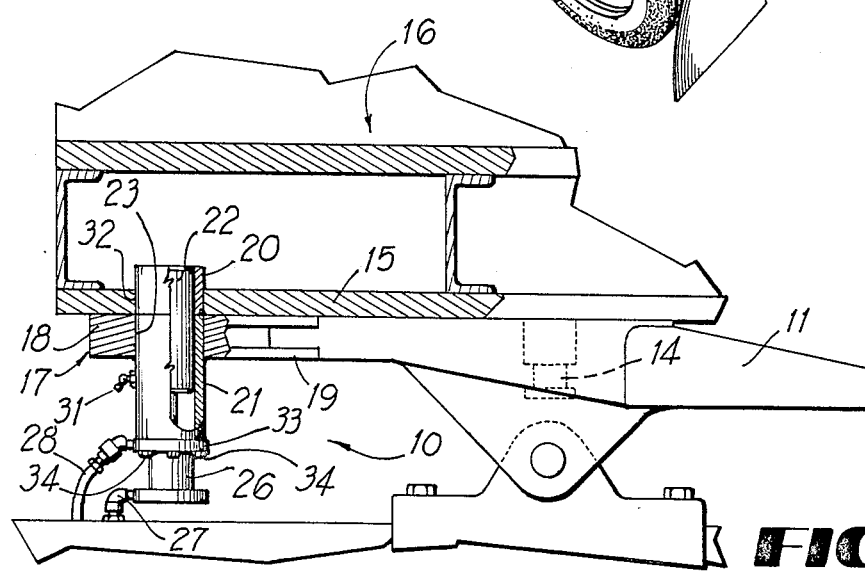
FIG. 2 is a vertical section showing the components of the invention on the fifth wheel and overlying king pin plate of a trailer.

More particularly, a guide sleeve 21 for a pneumatically operated cylindrical locking plunger 22 is secured by welding within an opening 23 formed through the solid portion of the mounting plate. One end of the sleeve 21, FIG. 2, is flush with the top face of the mounting plate, the other end of the sleeve projecting below the mounting plate 17 with the sleeve axis arranged perpendicular to the mounting plate.

The locking plunger 22 is connected by a threaded stud 24 with the piston rod 25 of a pneumatic actuator cylinder 26 which receives and returns air from the vehicle compressed air system through supply and return lines 27 and 28.

The flow of air to and from the pneumatic actuator 26 is controlled by a solenoid-operated control valve 29 receiving vehicle air through a line 30, this valve being controlled by a manual on-off switch on the instrument panel of the tractor 10, not shown.

In some cases, the operation of the coupling plunger 22 may be hydraulically controlled rather than pneumatically controlled or operated. A lubrication fitting 31, FIG. 2, is installed on the plunger guide sleeve 21 to insure proper lubrication of the plunger 22.

The coupling bushing 20, previously mentioned, is fixedly mounted by welding within an opening 32 formed in the tractor king pin or wear plate 15. The bushing 20 is coaxially aligned with the sleeve 21 so that it may receive the locking plunger 22 when the latter is extended upwardly from the sleeve by the actuator 26. The lower end of the bushing 20 is flush with the bottom of the king pin plate 15.

During normal usage of the semi-trailer or full trailer rig equipped with the invention, the plunger 22 is maintained retracted from the locking bushing 20 so that the vehicle may be maneuvered in the required manner. When a straight line backing situation is encountered, the rig is brought to a straightway situation so that the bushing 20 and plunger 22 are coaxially aligned vertically. If desired, a suitable mechanical or electronic indicator means, not shown, can be utilized to enable the driver to know precisely when the necessary alignment is present. At this time, the plunger 22 is extended by the actuator 26 and enters the bushing 20 as shown in FIG. 2 to prevent pivoting of the trailer relative to the tractor so that straight line backing up can occur.

The system is simplified, compact and very reliable. The prefabricated assembly of elements shown in FIG. 3 can be readily installed in the field on existing truck fifth wheels with a minimum of down time and labor, or can be installed on newly manufactured equipment.

FIG. 4 depicts a simple modification of the invention for extremely heavy duty applications. Instead of a single locking plunger 22 and bushing 20, as previously described, a pair of plungers 22' and associated parts shown in FIG. 3 are installed as a prefabricated assembly on an attachment mounting plate 17'. The assembly is attached to the fifth wheel 11 and two cooperative bushings 20 are similarly installed on the trailer king pin plate. The bushings and plungers 22' are spaced equidistantly on opposite sides of the axis of the king pin opening 13 in the fifth wheel 11.

Finally, it should be noted that a flange 33 of actuator cylinder 26 is coupled by screws 34 to the opposing end face 35 of guide sleeve 21, the end face 35 having threaded openings 36 to receive the screws 34.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A coupling for articulated vehicles having a fifth wheel to enable straight line backing up of the vehicle, said coupling comprising a prefabricated power-operated locking plunger assembly including a narrow crescent-shaped mounting plate segment fixedly attached to a curved frontal edge of a fifth wheel, said assembly further including a locking plunger, and a cooperative locking bushing fixedly attached to a trailer king pin plate and being adapted for coaxial alignment with said locking plunger of said assembly.

2. A coupling arrangement for an articulated vehicle having a tractor unit provided with a fifth wheel plate and a trailer provided with a king pin plate, the coupling arrangement comprising a narrow substantially cresecent-shaped mounting plate welded to a curved frontal edge of the fifth wheel plate and forming substantially an integral frontal extension on the fifth wheel plate, a locking plunger guide sleeve fixedly secured to the crescent-shaped mounting plate substantially at the transverse center thereof and having a bore whose axis is perpendicular to a plane occupied by the fifth wheel plate and the crescent-shaped mounting plate, a locking plunger disposed in said bore for reciprocation therein, a power actuator attached coaxially to one end of the locking plunger guide sleeve and being operatively connected with the locking plunger, and a locking plunger receiver bushing fixedly secured to the king pin plate of the trailer and being adapted for coaxial alignment with the locking plunger guide sleeve and locking plunger.

3. A coupling arrangement for an articulated vehicle as defined in claim 2, and said locking plunger guide sleeve having an end face flush with the top face of said crescent-shaped mounting plate and extending below said mounting plate and fifth wheel plate, and said locking plunger receiver bushing having a bottom end face flush with the bottom face of said king pin plate.

4. A coupling arrangement for an articulated vehicle as defined in claim 3, and said power actuator comprising a fluid pressure operated actuator having a remotely operated control valve.

5. In a coupling arrangement for an articulated vehicle to enable straight line backing up of the vehicle, the vehicle including a tractor unit having a fifth wheel plate and a trailer having a king pin plate, the improvement comprising in combination with said fifth wheel plate a narrow frontal mounting plate attachment for the fifth wheel plate fixedly secured thereto and forming substantially an integral extension thereof and occupying substantially a common plate therewith, a locking plunger guide sleeve fixed within an aperture of the narrow frontal mounting plate attachment at the transverse center thereof and the transverse center of the fifth wheel plate and having a bore which is perpendicular to the plate occupied by the fifth wheel plate and the narrow frontal mounting plate attachment, a reciprocatory locking plunger in said bore, and a power actuator means for said locking plunger attached bodily to said locking plunger guide sleeve and being operable to move the locking plunger in a direction relative to the guide sleeve whereby the locking plunger can enter a receiver bushing of a king pin plate of a trailer.

* * * * *